United States Patent [19]

Sellstedt et al.

[11] 3,898,217

[45] Aug. 5, 1975

[54] 7-(1-AMINOMETHYLCYCLOALKYLCARBOXA-MIDO)CEPHALOSPROANIC ACID DERIVATIVES

[75] Inventors: John H. Sellstedt, King of Prussia; Daniel M. Teller, Devon; Charles J. Guinosso, King of Prussia, all of Pa.

[73] Assignee: American Home Products Corporation, New York, N.Y.

[22] Filed: Mar. 30, 1973

[21] Appl. No.: 346,496

[52] U.S. Cl............ 260/243 C; 260/239.1; 424/246; 424/271
[51] Int. Cl.².................................. C07D 501/20
[58] Field of Search................ 260/239.1, 243 C

[56] References Cited

UNITED STATES PATENTS 3,516,997 6/1970 Takano et al.................... 260/243 C
3,592,812 7/1971 Alburn et al.................... 260/243 C Primary Examiner—Nicholas S. Rizzo
Attorney, Agent, or Firm—Richard K. Jackson

[57] ABSTRACT 3-(2-Aminomethylcycloalkylcarboxamido)-1,4-[cyclo-(1'-carboxy)alkylenethio]azetidin-2-one derivatives possessing antibacterial activity are produced by the reaction of an α-aminomethyl cycloalkylcarbonyl chloride with a 3-amino-1,4-[cyclo-(1'-carboxy)alkylenethio]azetidine-2-one.

3 Claims, No Drawings

7-(1-AMINOMETHYLCYCLOALKYLCARBOXAMIDO)-CEPHALOSPORANIC ACID DERIVATIVES

DESCRIPTION OF THE INVENTION

In accordance with this invention, there is provided a group of azetidin-2-one derivatives which are active anti-bacterials. More specifically, the compounds of this invention may be generically termed 3-α-aminomethylcycloalkylcarboxamido)-1,4-[cyclo(1'carboxy)alkylenethio]azetidin-2-one derivatives which present the structural formulae:

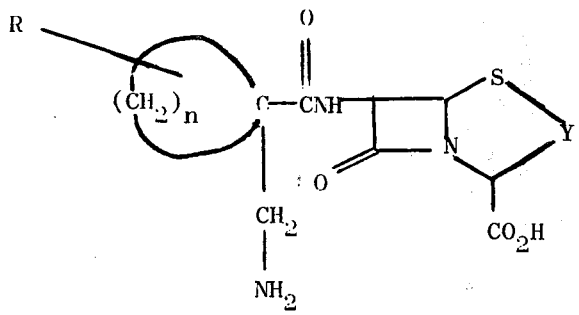

in which
R is —H or (lower)alkyl;
n is an integer from 4–7, inclusive; and
Y is

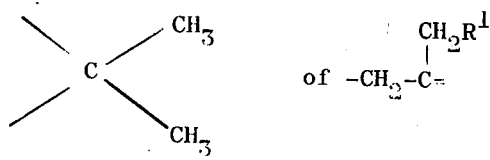

wherein $R^1$ is —H, (lower)alkanoyloxy,

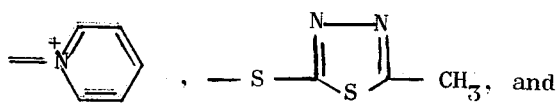

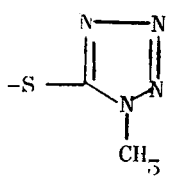

and the pharmaceutically acceptable addition salts thereof.

The expression 1,4-[cyclo-(1'-carboxy)alkylenethio], used in the generic name for the compounds of this invention, is intended to embrace the 1-carboxy bridge member

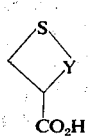

as it appears in the preceding paragraph. The term (lower)alkyl is used to designate univalent aliphatic hydrocarbon radicals containing from 1 to about 6 carbon atoms, illustrative of which members are methyl, ethyl, n-propyl, i-propyl, n-butyl, t-butyl, n-pentyl, n-hexyl and the like. The term (lower)alkanoyloxy embraces the lower fatty acyloxy moieties such as acetoxy, propanoyloxy, butanoyloxy, amyloxy, hexanoyloxy, and the like. The pharmaceutically acceptable addition salts contemplated embrace the alkali metal salts and the ammonium salt of the 1'-carboxy group as well as the acid addition salts of the free α-aminomethyl group such as those derived from hydrochloric, hydrobromic, sulfuric, nitric, phosphoric, benzenesulfonic, toluenesulfonic, methylsulfonic, and ethylsulfonic acids, and the like.

The 3-(α-aminomethylcycloalkylcarbonamido) azetidinone derivatives of this invention are prepared by the reaction of an α-aminomethylcycloalkylcarboxylic acid halide with the 3-amino azetidinone derivative designated $H_2NR^{11}$, thusly:

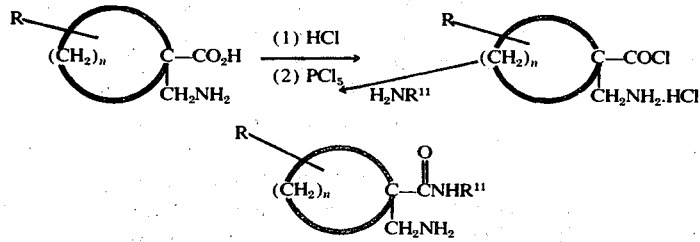

in which the values for R and n are given above, and $R^{11}$ represents the residue of the 3-amino azetidinone derivative as described supra in the generic structural formula. The free amino group in the α-aminomethyl cycloalkylcarboxylic acid reactant may be protected during the reaction with an acid to form an acid addition salt which may be readily removed by basification after the reaction. In addition, the α-aminomethyl group may be protected by cyclization with the α-carboxy group with ethyl chloroformate to afford an acylating agent other than an acid halide. Likewise, the free amino group and the free carboxy group in the azetidino reactant may be protected during the reaction with an alkali metal or tertiary amine, when operating in a mixed aqueous organic medium, or by mono- or disilylation, phosphorylation or saccharination. In each case, the protective groups are readily removed by hydrolysis at the conclusion of the reaction.

The compounds of this invention are useful in the fields of comparative pharmacology and microbiology and may be used in the treatment of bovine mastitis, as growth promotors in animals and for the treatment of infections amenable to treatment with penicillins and cephalosporins.

The α-aminomethylcycloalkylcarboxylic acid starting materials may be prepared by the method of E. Testa et al., Liebigs Ann. Chem., 639, 166(1961), wherein 1-aminomethylcyclopentanecarboxylic acid is described. By analogy, 1-aminomethylcyclohexanecarboxylic acid is prepared by reducing ethyl α-cyanocyclohexanecarboxylate (J. Cadogan et al., J. Chem. Soc. (London), 1932, (1965) with Raney nickel to afford ethyl α-aminomethylcyclohexanecarboxylate, b.p. 62°–69°C./0.1 mm. Hg. which is hydrolyzed with concentrated hydrochloric acid to yield the HCl salt of the free carboxylic acid as colorless crystals m.p. 201°–203°C. The α-aminomethylcyclohexanecarboxylic acid hydrochloride is then readily converted to the acid chloride, m.p. 160°–165°C. (decomp.) with $PCl_5$ to provide the desired acylating agent. The corresponding cycloheptane and cyclooctane derivatives may be produced in the same manner.

The following examples are presented for purposes of illustration and should not be construed as limitations upon the true scope of this invention. The biological activity data presented after each example illustrates the compounds activity against specific bacteria of the designated strain in terms of the minimum inhibitory concentration of the compound in micrograms per milliliter to completely inhibit the test organism.

EXAMPLE 1

7-(1-Aminomethylcyclohexanecarboxamido)cephalosporanic acid.

A mixture of 7-aminocephalosporanic acid (1.36 g, 0.005 moles) and hexamethyldisilazane (0.84 ml, 0.004 moles) in methylene chloride (14 ml.) containing 2 drops of chlorotrimethylsilane is refluxed for 5 hours and then allowed to stand at room temperature for 14 hours. The solution is cooled to 10°C, dimethylaniline (0.64 ml) is added and then 1-aminomethylcyclohexanecarboxylic acid chloride hydrochloride (1.06 g, 0.005 moles) is added to 0°C. over 10 minutes. After stirring at 5°C. for 15 minutes and 10°–15°C. for 30 minutes the clear yellow solution is poured into 40 ml of iced water. The pH of the mixture is raised to 9.0 with potassium carbonate, the solution washed with diethyl ether to remove dimethyl aniline, and the pH is lowered to 5.0 with concentrated hydrochlorice acid. After concentration in vacuo < 35°C. to about 30 ml. the mixture is purified on an XAD-2 resin column by washing with 3 × 150 ml. of water and eluting with 150 ml. of an 8/2 mixture of acetone/water. Freeze-drying gives the title compound, m.p. 275°–278°C. (decomp.) $\lambda_{max}^{KBr}$ 5.69, 6.28 $\mu$; NMR has singlets at 1.55 and 2.03 ppm.

| Ba. subtilis | 6633 | — .976 |
|---|---|---|
| St. aureus | 6538P | — 3.90 |
| St. aureus | SMITH | — 3.90 |
| St. aureus | CHP | — 15.6 |
| St. aureus | 53-180 | — 15.6 |
| Ba. brochiseptica | 4617 | — 250 |
| Es. coli | 9637 | — 250 |
| Ne. catarrhalis | 8193 | — 250 |

EXAMPLE 2

7-(1-Aminomethylcyclopentanecarboxamido)cephalosporanic acid.

Using the procedure described in Example 1 but substituting 1-aminomethylcyclopentanecarboxylic acid chloride hydrochloride (0.99 g, 0.005 moles) for 1-aminomethylcyclohexanecarboxylic acid chloride hydrochloride and refluxing 75 minutes instead of 5 hours gives the title compound after columning on XAD-2 resin and freeze-drying, m.p. 250°–300°C. (d), $\lambda_{max}^{KBr}$ 5.65 $\mu$; NMR has 1.80 and 2.12 ppm peaks.

| Ba. subtilis | 6633 | — .488 |
|---|---|---|
| St. aureus | 6538P | — 1.95 |
| St. aureus | SMITH | — 3.90 |
| St. aureus | CHP | — 3.90 |
| St. aureus | 53-180 | — 7.81 |
| Kl. pneumoniae | 10031 | — 31.3 |
| Sa. paratyphi | 11737 | — 62.5 |
| Es. coli | 9637 | — 125 |
| Bo. brochiseptica | 4617 | — 250 |

EXAMPLE 3

6-(1-Aminomethylcyclohexanecarboxamido)penicillinic acid

Using the procedure described in Example 1 but substituting 6-aminopenicillanic acid (1.08 g, 0.0005 moles) for 2-aminocephalosporanic acid and refluxing for 3 hours instead of 5 hours gives the title compound after columing on XAD-2 resin and freeze-drying; m.p. 180°–230°C. (decomp.); $\lambda_{max}^{KBr}$ 5.64, 6.17 $\mu$; NMR has 1.58 and 1.70 ppm peaks.

| Ba subtilis | 6633 | — .976 |
|---|---|---|
| St. aureus | 6538P | — 1.95 |
| St. aureus | SMITH | — 1.95 |
| He. species | 9955 | — 3.90 |
| Sa. paratyphi | 11737 | — 15.6 |
| Es. intermedia | 65-1 | — 31.3 |
| Ne. catarrhalis | 8193 | — 31.3 |
| St. aureus | 53-180 | — 31.3 |
| St. aureus | CHP | — 31.3 |
| Es. coli | 9637 | — 62.5 |
| En. aerogenes | 13048 | — 125 |
| Pr. vulgaris | 6896 | — 125 |

EXAMPLE 4

6-(1-Aminomethylcyclopentanecarboxamido)penicillanic acid.

Using the procedure described in Example 3 but substituting 1-aminocyclopentanecarboxylic acid chloride hydrochloride (1.07 g, 0.005 moles) for 1-aminomethylcyclohexanecarboxylic acid chloride hydrochloride and refluxing for 3 hours instead of 5 hours gives the title compound after columning on XAD-2 resin and freeze-drying; m.p. 178°–210°C. (decomp.); $\lambda_{max}^{KBr}$ 5.67, 6.23 $\mu$; NMR has 1.54 and 1.70 ppm peaks.

| Ba. subtilis | 6633 | — .488 |
|---|---|---|
| St. aureus | 6538P | — .976 |
| St. aureus | SMITH | — .976 |
| Sa. paratyphi | 11737 | — 3.90 |
| He. species | 9955 | — 7.81 |

-Continued

| | | | |
|---|---|---|---|
| Ne. catarrhalis | 8193 | — | 7.81 |
| St. aureus | CHP | — | 7.81 |
| St. aureus | 53-180 | — | 7.81 |
| Es. intermedia | 65-1 | — | 15.6 |
| Es. coli | 9637 | — | 31.3 |
| Bo. brochiseptica | 4617 | — | 125 |
| Pr. vulgaris | 6896 | — | 125 |
| En. aerogenes | 13048 | — | 250 |

What is claimed is:

1. A compound of the formula

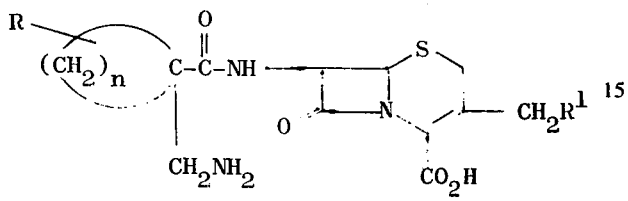

wherein
R is —H or lower alkyl;
$R^1$ is —H, (lower)alkanoyloxy,

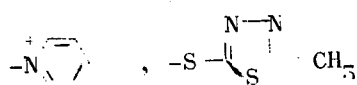

or 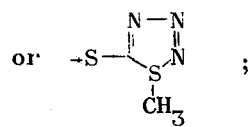 ;

n is an integer from 4–7, inclusive; and the pharmaceutically acceptable addition salts thereof.

2. A compound of claim 1 which is 7-(1-aminomethylcyclohexanecarboxamido)cephalosporanic acid.

3. A compound of claim 1 which is 7-(1-aminomethylcyclopentanecarboxamido)cephalosporanic acid.

* * * * *

UNITED STATES PATENT OFFICE
CERTIFICATE OF CORRECTION

PATENT NO. : 3,898,217
DATED : August 5, 1975
INVENTOR(S) : John H. Sellstedt, Daniel M. Teller and
Charles J. Guinosso It is certified that error appears in the above-identified patent and that said Letters Patent are hereby corrected as shown below:

Column 6, Claim 1, the structural formulae should be --

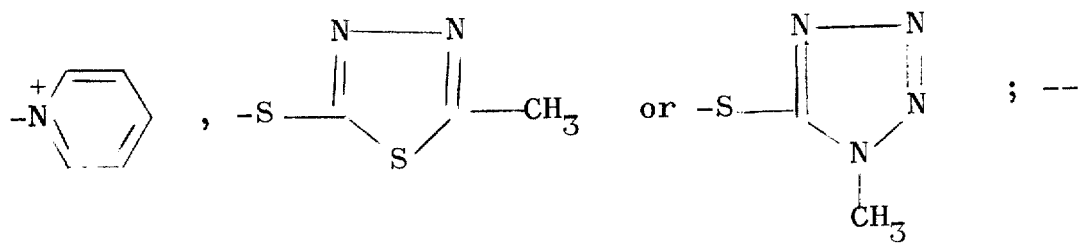

Signed and Sealed this first Day of June 1976

[SEAL]

Attest:

RUTH C. MASON
Attesting Officer

C. MARSHALL DANN
Commissioner of Patents and Trademarks